US005328054A

United States Patent [19]

Hoeberigs

[11] Patent Number: 5,328,054

[45] Date of Patent: Jul. 12, 1994

[54] AUTOMATIC PORTIONING AND WEIGHING ARRANGEMENT

[75] Inventor: Rudolf Hoeberigs, Knokke-Heist, Belgium

[73] Assignee: Jean M. M. Hoeberigs, Netherlands

[21] Appl. No.: 778,150

[22] PCT Filed: Aug. 2, 1991

[86] PCT No.: PCT/BE91/00055

§ 371 Date: Feb. 11, 1992

§ 102(e) Date: Feb. 11, 1992

[30] Foreign Application Priority Data

Aug. 7, 1990 [BE] Belgium .............................. 09000774

[51] Int. Cl.[5] .............................................. G01G 13/00

[52] U.S. Cl. ...................................... 222/77; 222/129; 222/354; 222/355; 222/369; 222/414

[58] Field of Search .................... 222/55, 77, 129, 354, 222/355, 356, 369, 410, 415; 198/469.1, 478.1

[56] References Cited

U.S. PATENT DOCUMENTS

| | | | |
|---|---|---|---|
| 3,896,715 | 7/1975 | Mascret | 99/356 |
| 4,552,460 | 11/1985 | Wallace | 222/369 X |
| 4,586,429 | 5/1986 | Hawkins | 99/407 |
| 4,595,125 | 6/1986 | Alwerud | 222/55 |
| 4,793,512 | 12/1988 | Krauss | 222/55 X |
| 5,092,490 | 3/1992 | Suzuki et al. | 222/77 X |

FOREIGN PATENT DOCUMENTS

| | | | |
|---|---|---|---|
| 0313037 | 4/1989 | European Pat. Off. . | |
| 1431228 | 1/1966 | France . | |
| 2515959 | 11/1981 | France . | |
| 2593308 | 7/1987 | France . | |
| WO84/02457 | 7/1984 | PCT Int'l Appl. . | |
| 540463 | 10/1941 | United Kingdom | 222/369 |

*Primary Examiner*—Andres Kashnikow
*Assistant Examiner*—Joseph A. Kaufman
*Attorney, Agent, or Firm*—Nixon & Vanderhye

[57] ABSTRACT

An automatic portioning and weighing arrangement for loose products (15) comprises at least one store drum (2) whereby the store drum (2) comprises at least one portioning capacity (6) wherein separate portions of the products (15) are formed. The weighing arrangement (4) comprises at least one collecting capacity (40) for the loose products. The store drum (2) has been arranged almost horizontally and the portioning capacity (6) extends over almost the complete length of the store drum (2). As a consequence, the chance for choking ups is almost nonexistant on delivery of the loose products (15).

5 Claims, 3 Drawing Sheets

AUTOMATIC PORTIONING AND WEIGHING ARRANGEMENT

BACKGROUND AND SUMMARY OF THE INVENTION

The invention relates to an automatic portioning and weighing arrangement for loose products, the arrangement comprising at least one store drum whereby the store drum comprises at least one portioning capacity wherein separate portions of the products may be formed and whereby the weighing arrangement comprises at least one collecting capacity. Examples of such "loose products" are popcorn, chips, french fries, sweets, pastery, small metal products or products made from a synthetic material.

Such automatic portioning and weighing arrangements may be used in automated rapid kitchens, but also in automations which may be served by means of a coin or insert piece.

Such an automatic portioning and weighing arrangement is known from the American patent specification U.S. Pat. No. 3,690,247. The store drum of this portioning and weighing device is obliquely arranged so that with a rotating drum the loose products make their way to the lowest part. The portioning capacity is at the level of this lowest part. The portioning capacity consists of parts which radially project from the jacket of the drum. With a rotating drum these parts carry each time a portion of products which is delivered somewhat further in a collecting capacity. This rotation of the drum continues until a specified weight is reached in the collecting capacity. Then the rotation stops.

This arrangement according to the state of the art, however, displays different drawbacks: First, the portioning capacity is rather small, as a consequence the chance for choking ups with the delivery of products is great. Next, a lot of space is needed around the store drum because of the structure of the portioning capacities. The weighing is also mostly inaccurate: Rest product may be wedged at the delivery valve of the portioning capacity and may, after the rotation of the store drum has ended, so after the desired weight has been reached, still fall into the collecting capacity in such a way that the eventually obtained weight is greater than the adjusted weight. Finally, the store drum is difficult to clean.

The object of the invention is to avoid the above mentioned drawbacks.

The invention provides an automatic portioning and weighing arrangement for loose products, the arrangement comprising at least one store drum whereby the store drum comprises at least one portioning capacity wherein separate portions of the products may be formed and whereby the weighing arrangement comprises at least one collecting capacity. The store drum is almost horizontally arranged and the portioning capacity extends over almost the complete length of the store drum. Hence there is a rather large portioning capacity, which makes the chance for choking ups almost nonexistant.

According to a preferable embodiment, the store drum is cylindrical and the portioning capacity is completely within the circumference of the store drum. This has the advantage that the store drum takes little space.

Preferably, the portioning capacity is formed by a part of the outer jacket of the store drum and by the delivery valve. Preferably, the delivery valve is rotatable around an axle which is excentric and almost parallel to the axis of the store drum over the whole length of the store drum and the rotation of the delivery valve is commanded by means of a cam. Preferably, the arrangement is further provided with a filling valve which is rotatable around the same axle as the delivery valve and whereby the delivery valve rests on the filling valve in the delivery position. To fill the store drum the delivery valve is not in the delivery position and the filling valve is brought against the delivery valve. The advantage of such a system of valves is that there is a minimum amount of machine parts and that cleaning is easy.

According to a preferable embodiment, the portioning and weighing arrangement is further provided with an endless conveyor belt where the loose products fall on on delivery from the portioning capacity. This belt carries the products to the weighing arrangement. Such an embodiment has as an advantage that the belt functions as a kind of buffer between the store drum with the portioning capacity and the weighing arrangement : The weighing arrangement does no longer order the rotation of the store drum. Rest product falls always on the belt and not in the collecting capacity of the weighing arrangement such that accurate measurements may be done. Preferably, the circumferential velocity of the belt and the rotation of the store drum are so regulated that the belt receives one portion of loose products every half revolution.

According to another preferable embodiment, the weighing arrangement is provided with a blocking slide which may block all possible delivery of loose products to the collecting capacity of the weighing arrangement. Such an embodiment also increases the chance for accurate measurements: Once the adjusted weight has been reached, the blocking slide closes and no products, even no rest product, may enter the collecting capacity.

According to a particular and preferable embodiment, the portioning and weighing arrangement is provided with two cylindrical store drums which are in parallel positioned adjacent to one another in such a way that both may deliver portions of loose products to the same weighing arrangement. Such a positioning allows for a continuous working if one of both store drums must be filled or cleaned.

According to another particular and preferable embodiment the portioning and weighing arrangement is provided with two collecting capacities which are horizontally movable and which may serve two separate working up installations. Such an embodiment leads to an accelerated working : while the one quantity is being weighed, the other quantity may already be delivered to the working up installation.

BRIEF DESCRIPTION OF THE ACCOMPANYING DRAWINGS

The invention will now be further illustrated by way of an example of an embodiment and with reference to figures whereby FIG. 1 is a front view of a portioning and weighing arrangement;

FIGS. 4(*a*) to 4(*d*) show different positions of the store drum of the portioning and weighing arrangement.

DETAILED DESCRIPTION OF THE PREFERRED EMBODIMENTS

Figure 1:
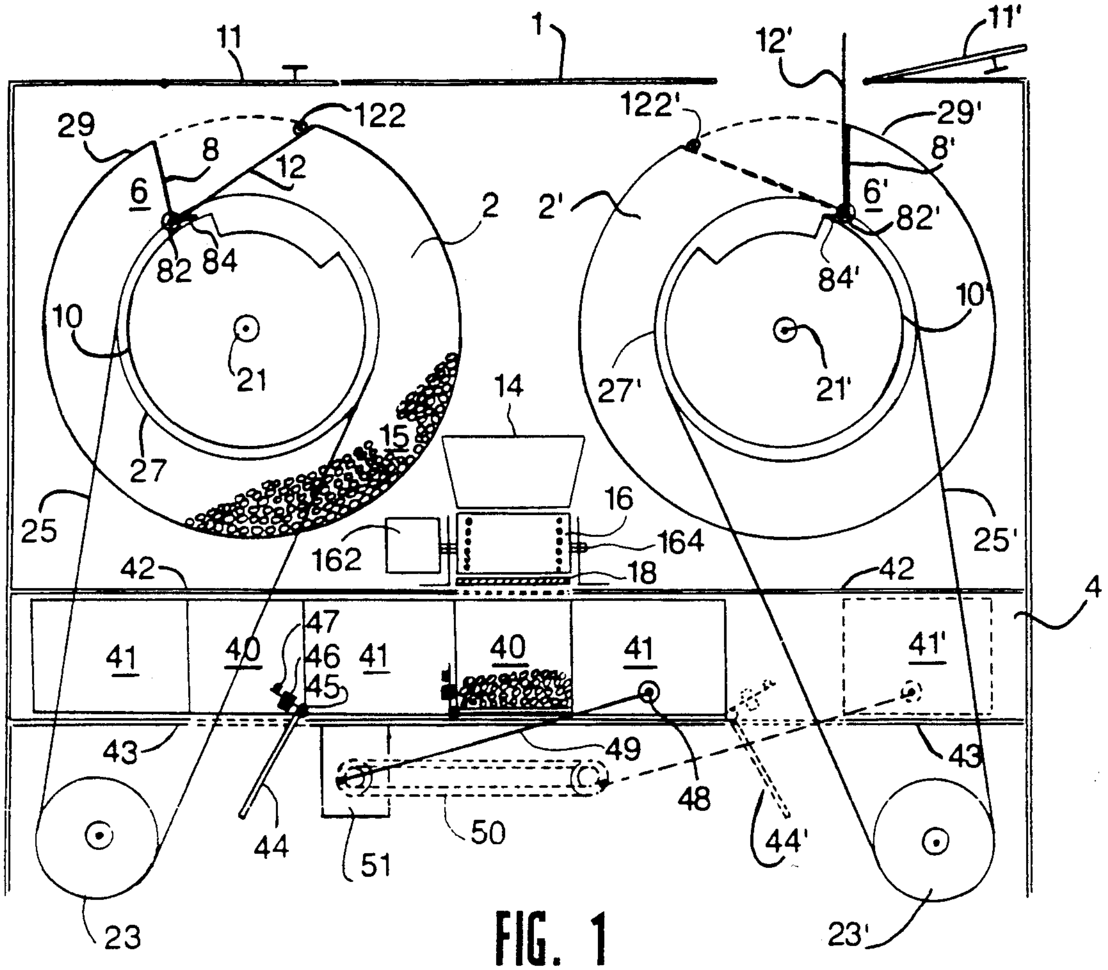
Figure 3:
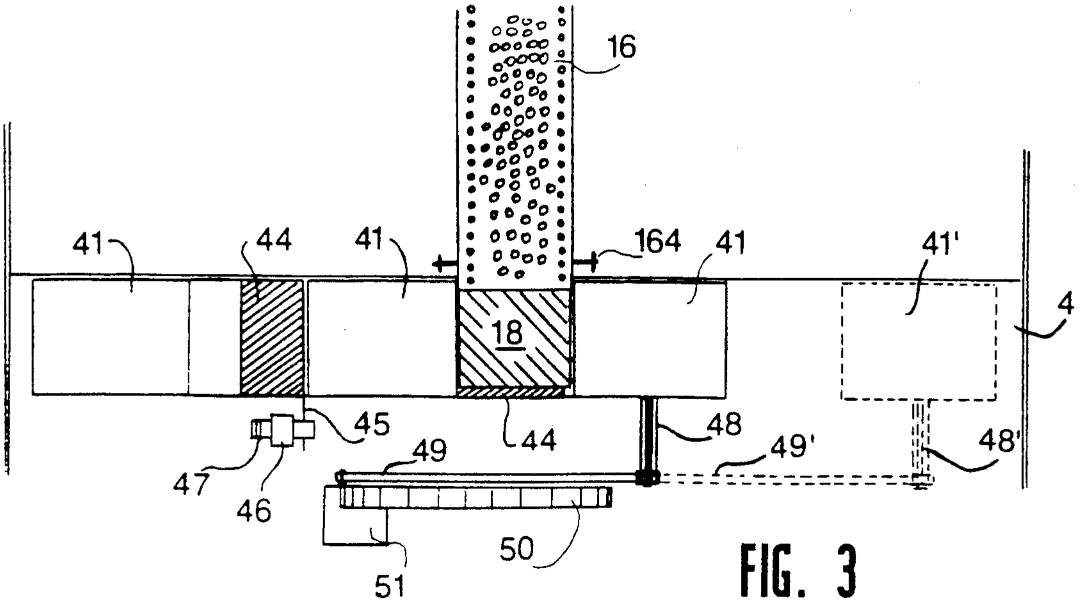
FIG. 3 is an upper view of a weighing arrangement alone.
Figure 2:
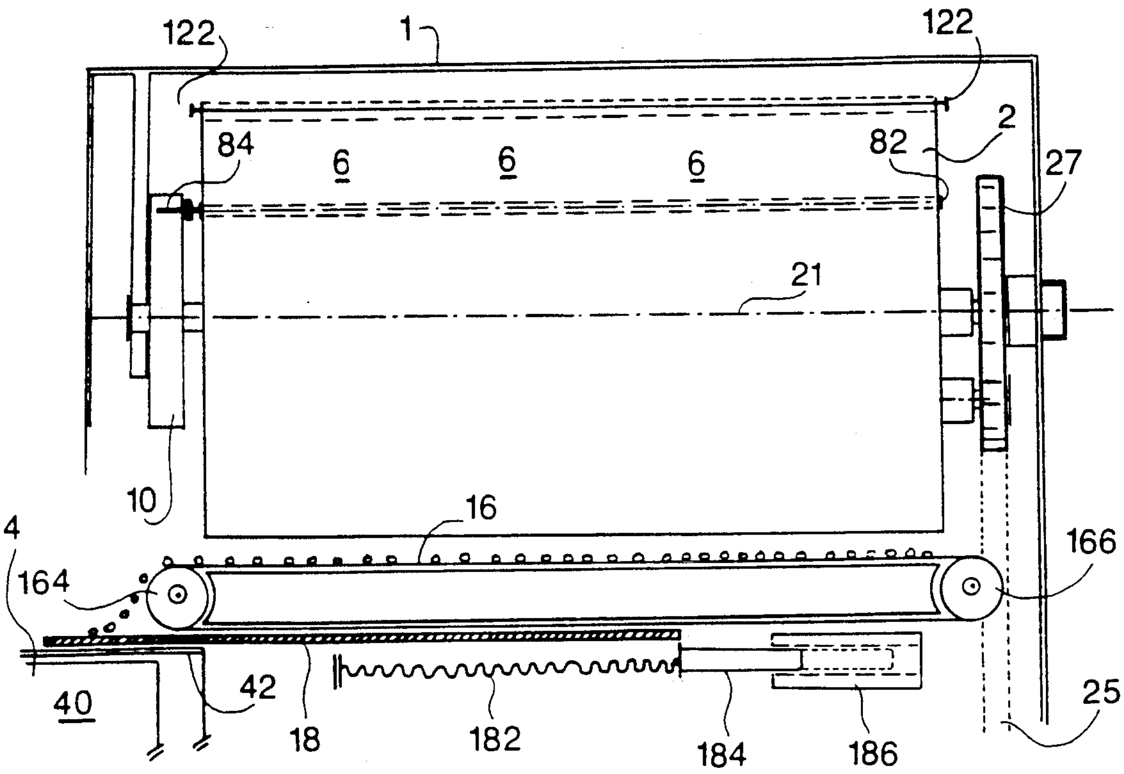
FIG. 2 is a side view of a portioning and weighing arrangement.
Figure 4A:
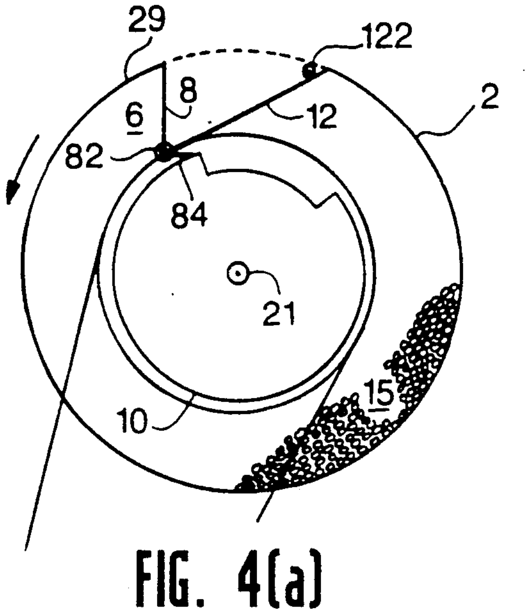
Figure 4B:
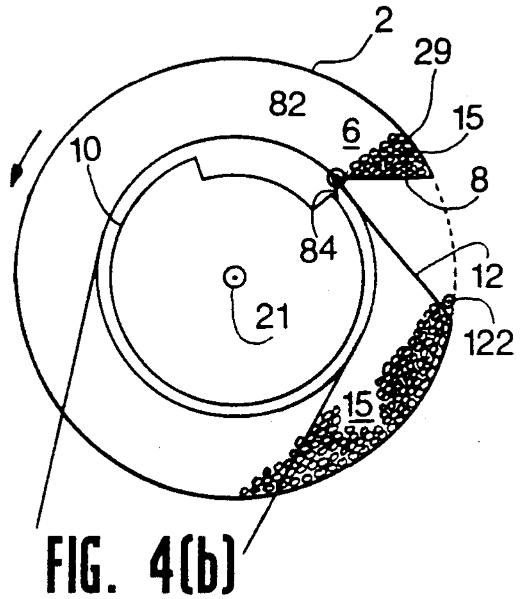
Figure 4C:
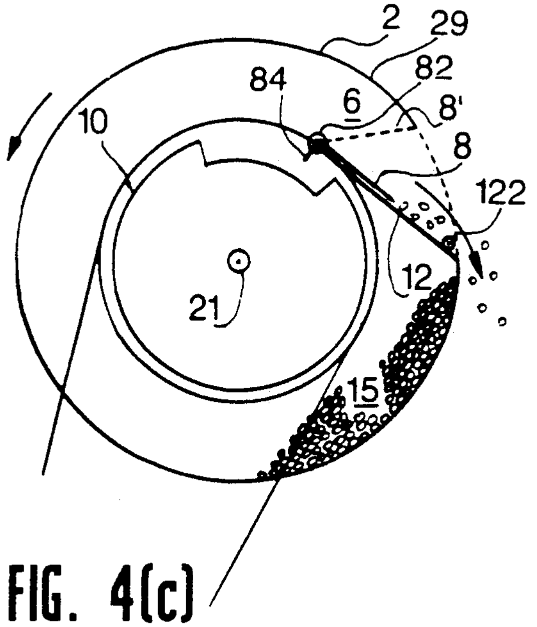
Figure 4D:
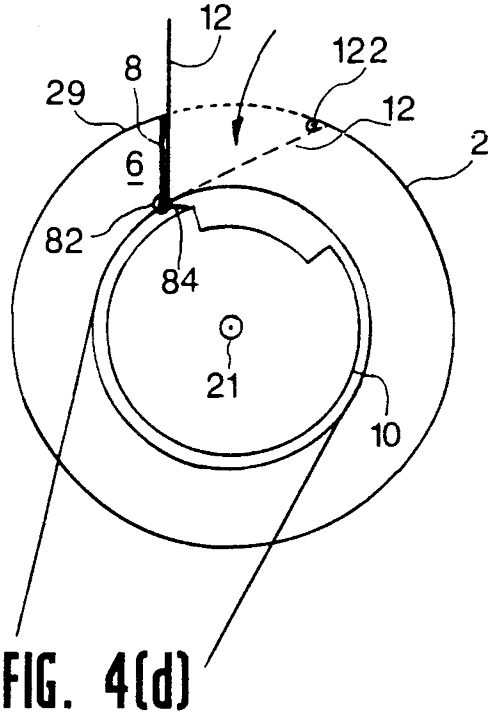

Referring to FIGS. 1 and 2 an embodiment of a portioning and weighing arrangement according to the invention comprises a housing 1, wherein two horizontally arranged store drums 2,2' are arranged. Through a small door 11 the store drums 2,2' can be reached in order to fill or to clean them. The store drums 2,2' each rotate around a horizontal axis 21,21' and may be driven by means of a driving wheel 23,23' a chain 25,25' and a toothed wheel 27,27' In front of the store drums 2,2' and somewhat lower is the weighing arrangement 4.

Within the circumference of the store drum 2,2' is the portioning capacity 6,6' which is formed by a delivery valve 8,8' and by the nearest part 29,29' of the outer jacket of the store drum 2,2'. This portioning capacity 6,6' extends over the length of the store drum 2,2'. The delivery valve 8,8' is fixedly connected to an axle 82,82' which is rotatably mounted through both extremities of the drum. The delivery valve 8,8' is further provided with a protruding part 84,84' which cooperates with a cam 10,10' and which determines in this way the position of the delivery valve 8,8'. Further there is provided a filling valve 12,12' which is rotatable around the same axle 82,82' as the delivery valve 8,8'. In closed position the filling valve 12,12' is maintained by means of a pawl 122,122' (see left drum 2 on FIG. 1). In open position the filling valve 12,12' is rotated against the delivery valve 8,8' (see right drum 2' on FIG. 1).

A funnel like guiding 14 takes care that loose products 15 fall on a conveyor belt 16 at their delivery. This conveyor belt 16 is moved on over two wheels 164,166 one of which is driven. At the end of the conveyor belt 16 the products 15 fall on a blocking slide 18 or in the weighing capacity 40.

This slide 18 is commanded by means of an electromagnetic draw-spring 182 and may close the supply to the weighing capacity 40. If the supply to the weighing capacity is not closed, then the piston 184 of the electromagnetic drawspring 182 is completely in the cylinder 186.

The weighing arrangement 4 consists of two weighing capacities 40 which are formed by three blocks 41 which are fixedly connected to one another. These blocks 41 may be guided horizontally between an upper guiding 42 and an under guiding 43. At the bottom the weighing capacities are closed each time by means of a weighing valve 44 which is rotatable around a horizontal axle 45. This axle 45 is provided with an adjustable counter-weight 46 and with a point of contact 47 which may command a switch (not shown). This switch may give a signal to the above-mentioned electromagnetic draw-spring 182. By means of an axle 48 which is fixedly connected with a block 41, a rod 49, a chain 50 and a motor 51 the blocks may be moved between two extreme positions: on FIG. 1 one position is presented in full lines and the other position in dotted lines. The filling of the weighing capacity 40 takes place through one central opening in the upper guiding 42, the emptying of the weighing capacities 40 takes place at the right or at the left side. As a consequence, two working up units may be served. Moreover, one processing unit may be served from one weighing capacity 40, while the other weighing capacity 40 is being filled.

Referring to FIG. 4, the working of the storage drum 2 is as follows: in the position presented in FIG. 4(*a*) the filling valve 12 is held by means of a pawl 122 and the delivery valve has just come from the delivery position. The store drum 2 (together with the valves 8 and 12) rotates in the direction of the arrow, while the loose products 15 remain more or less at the bottom in the store drum 2. The cam 10 does not rotate. When the delivery valve 8 comes at the bottom, it takes some of the loose products 15 with it (see FIG. 4(*b*)). The loose products 15 are then in the portioning capacity 6 which is formed by a part of the outer jacket 29 and by the delivery valve 8. When the delivery valve 8 is brought somewhat higher than the point shown by FIG. 4(*b*) then the protruding part 84 is released in the recess of the cam 10 and the delivery valve 8 overturns thereby moving the delivery valve 8 from its collection position (shown by dashed-line identified by reference number 8' in FIG. 4(*c*)) to its delivery position (shown in solid line in FIG. 4(*c*)) where it is disposed against the filling valve 12 and in this way releases the formed portion of loose products, such as shown on FIG. 4(*c*) The loose products 15 land on the conveyor belt 16 and are brought to one of the two weighing capacities. The number of loose products is gradually growing until the desired weight—which is adjustable by means of the counterweight 46—is reached. Then contact point 47 looses a determined contact, which gives a signal to the electromagnetic draw-spring 182 which has the blocking slide close the weighing capacity such that no product can fall anymore into the weighing capacity. Rest product 15 which has possibly still been supplied, is heaping up on the blocking slide 18. As a consequence, the weighing is accurate because it cannot be falsified by rest product which has sporadically stayed behind. Subsequently, the blocks 41 are moved to the other extreme position such that the weighing valve 44 may supply the products 15 to the one working up unit (not shown) through an opening in the under guiding 43. In the meantime the other weighing capacity 40 has taken position under the central opening and the blocking slide 18 releases this weighing capacity 40, after which this may also be filled with the desired quantity of products 15.

Preferably, the whole may be provided with time switches and synchronisation means (both not shown), which are well known from the prior art.

For example, the switching from the one store drum 2 to the other store drum 2' may be carried out automatically : this may be done at the beginning of each weighing activity by having a time switch run from zero until the end of a time period corresponding to the duration for one portioning (is equal to the time the conveyor belt 16 needs to make half a circulation). If the weighing has not ended hereafter, this means that the one drum 2 is empty. By means of a switch the rotation of this one drum 2 is ended and the motor of the other drum 2' is started.

In the position shown in FIG. 4(*d*) the delivery valve 8 is no longer in the delivery position (protruding part 84 is no longer in the recess of cam 10), but is in its collection position. Furthermore, the filling valve is no longer held by the pawl 122 to allow the filling valve 12 to be moved from its operative position (shown in dashed-line in FIG. 4(*d*)) to its filling position (shown in solid line in FIG. 4(*d*) where it rests against the delivery valve 8. In this filling position the store drum 2 can be cleaned or filled.

I claim:

1. An automatic portioning and weighing arrangement for loose products, said arrangement comprising:

a collecting capacity for collecting loose products;

an outer jacket;

at least one cylindrical store drum which is rotatable about a central axis thereof and disposed substantially horizontally within said outer jacket;

an eccentric axle disposed substantially parallel to said central axis of said cylindrical store drum;

a delivery valve pivotally connected at one end thereof to said eccentric axle so as to be pivotally movable thereabout between collection and delivery positions;

a filing valve which is also pivotally connected at one end thereof to said eccentric axle so as to be pivotally movable thereabout between operative and filling positions; wherein said store drum includes a portioning capacity extending substantially over a complete length of said store drum, said portioning capacity being defined collectively by a part of said outer jacket and said delivery valve when in said collection position thereof;

said arrangement further comprises a cam which actuates said delivery valve in response to rotation of said store drum to cause said delivery valve to pivotally move from said collection position into said delivery position against said filling valve in said operative position thereof to allow said products in said portioning capacity to be discharged therefrom; and wherein said filling valve is pivotally movable from said operative position into said filling position against said delivery valve in said collection position to thereby allow loose product to be introduced into said store drum.

2. A portioning and weighing arrangement according to claim 1, which further comprises an endless belt disposed between said store drum and said collection capacity for receiving said products discharged from said portioning capacity by said delivery valve when in said delivery position thereof and transferring said discharged products to said collection capacity.

3. A portioning and weighing arrangement according to claim 2, further comprising a blocking slide which is movable into a position to block all possible delivery of said products to said collecting capacity.

4. A portioning and weighing arrangement according to claim 3, wherein two of said cylindrical store drums are provided and are positioned parallel and adjacent one another in such a way that both said store drums are capable of delivering portions of loose products to said collecting capacity.

5. A portioning and weighing arrangement according to claim 4, wherein two collecting capacities are provided which are horizontally movable to service two separate working installations.

* * * * *